United States Patent
Zhang

(10) Patent No.: US 11,994,383 B2
(45) Date of Patent: May 28, 2024

(54) METHOD FOR SAMPLING WHEEL ACCELERATION AND DETERMINING ROTATION ANGULAR POSITION OF WHEEL, AND TIRE PRESSURE MONITORING SYSTEM

(71) Applicant: Autochips Wuhan Co., Ltd., Wuhan (CN)

(72) Inventor: Tao Zhang, Wuhan (CN)

(73) Assignee: AUTOCHIPS WUHAN CO., LTD., Wuhan (CN)

( * ) Notice: Subject to any disclaimer, the term of this patent is extended or adjusted under 35 U.S.C. 154(b) by 363 days.

(21) Appl. No.: 17/496,764

(22) Filed: Oct. 8, 2021

(65) Prior Publication Data
US 2022/0113132 A1 Apr. 14, 2022

(30) Foreign Application Priority Data
Oct. 12, 2020 (CN) .......................... 202011085077.5

(51) Int. Cl.
*B60C 23/04* (2006.01)
*G01B 21/22* (2006.01)
(Continued)

(52) U.S. Cl.
CPC .......... *G01B 21/22* (2013.01); *B60C 23/0488* (2013.01); *B60C 23/0489* (2013.01);
(Continued)

(58) Field of Classification Search
CPC . G01B 21/22; B60C 23/0488; B60C 23/0489; B60C 23/0474; B60C 23/0416;
(Continued)

(56) References Cited

U.S. PATENT DOCUMENTS 5,760,682 A 6/1998 Liu et al.
6,222,444 B1 4/2001 Wang
(Continued)

FOREIGN PATENT DOCUMENTS

CN 103153656 A 6/2013
CN 103171378 A 6/2013
(Continued)

OTHER PUBLICATIONS

Taiwan Patent examination and approval, Application No. 110136340, mailed Jul. 14, 2023 (6 pages).
(Continued)

*Primary Examiner* — B M M Hannan

(57) ABSTRACT

A method for sampling wheel acceleration, a method for determining rotation angular position of a wheel, and a tire pressure monitoring system are disclosed. The method for sampling wheel acceleration may include: acquiring a real-time wheel acceleration value of a target wheel and calculating a time length required to rotate for a preset number of revolutions of the target wheel according to a first association relationship between the wheel acceleration and the time length required to rotate for the preset number of revolutions of the target wheel; obtaining a time interval between any two adjacent sampling points according to the time length required to rotate for the preset number of revolutions; and sampling the wheel acceleration of the target wheel once every the time interval starting from any time.

13 Claims, 10 Drawing Sheets

S11: a first rotation angular position of the target wheel at a first moment and a second rotation angular position of the target wheel at a second moment may be acquired through a tire pressure monitoring device installed on the target wheel S12: a reference angular position difference of each wheel from the first moment to the second moment may be acquired through a wheel speed sensor installed on the each wheel S13: the target wheel may be positioned based on a magnitude relationship between a target angular position difference and the reference angular position difference of the each wheel, wherein the target angular position difference may be a difference between the second rotation angular position and the first rotation angular position

(51) Int. Cl.
  *G01L 17/00* (2006.01)
  *G01L 19/00* (2006.01)
  *G01P 3/00* (2006.01)
  *G07C 5/08* (2006.01)

(52) U.S. Cl.
  CPC .......... *G01L 17/00* (2013.01); *G01L 19/0092* (2013.01); *G01P 3/00* (2013.01); *G07C 5/0825* (2013.01)

(58) Field of Classification Search
  CPC ........ G01L 17/00; G01L 19/0092; G01P 3/00; G07C 5/0825
  USPC .......................................................... 701/344
  See application file for complete search history.

(56) References Cited

U.S. PATENT DOCUMENTS

| | | | |
|---|---|---|---|
| 2003/0058118 A1* | 3/2003 | Wilson | B60C 23/0483 340/442 |
| 2007/0068273 A1* | 3/2007 | Cunningham | G07C 5/085 73/781 |
| 2008/0015763 A1 | 1/2008 | Kitazaki et al. | |
| 2009/0256415 A1* | 10/2009 | Bourqui | B60L 3/0023 303/3 |
| 2010/0065386 A1* | 3/2010 | Bourqui | B60L 7/06 188/159 |
| 2012/0041644 A1* | 2/2012 | Turner | B62D 15/0245 701/41 |
| 2012/0041658 A1* | 2/2012 | Turner | B62D 15/0245 701/1 |
| 2013/0179113 A1 | 7/2013 | Guinart | |
| 2015/0057878 A1 | 2/2015 | Friel et al. | |
| 2019/0088044 A1* | 3/2019 | Oh | G01M 15/00 |
| 2019/0168550 A1* | 6/2019 | Kuchler | B60C 23/0416 |
| 2019/0241031 A1* | 8/2019 | Billy | B60C 23/0488 |
| 2020/0307326 A1* | 10/2020 | Loeffler | B60C 23/0471 |
| 2020/0393243 A1* | 12/2020 | Boisset | B60C 23/0488 |
| 2021/0001673 A1* | 1/2021 | Schott | B60C 19/00 |
| 2021/0035160 A1* | 2/2021 | Xu | G06Q 30/0265 |
| 2021/0053643 A1* | 2/2021 | Murphy | B62K 23/04 |

FOREIGN PATENT DOCUMENTS

| | | | | |
|---|---|---|---|---|
| CN | 103502025 A | | 1/2014 | |
| CN | 103707728 A | | 4/2014 | |
| CN | 103717469 A | | 4/2014 | |
| CN | 103895459 A | | 7/2014 | |
| CN | 103895460 A | | 7/2014 | |
| CN | 103963575 A | | 8/2014 | |
| CN | 105584303 A | | 5/2016 | |
| CN | 110667317 A | | 1/2020 | |
| CN | 111016553 A | | 4/2020 | |
| CN | 110667317 B | * | 6/2021 | ............ B60C 23/00 |
| DE | 102008007775 A1 | | 8/2009 | |
| EP | 2703193 A1 | | 3/2014 | |
| EP | 2749436 A1 | | 7/2014 | |
| TW | 201623038 A | | 7/2016 | |
| WO | WO-2007038278 A2 | * | 4/2007 | ............ G01L 3/247 |

OTHER PUBLICATIONS

Chinese First Office Action, Chinese Application No. 202011085077.5, mailed Aug. 10, 2023 (12 pages).
Notice of examination opinions,Taiwan, China Application No. 110136340, mailed Mar. 31, 2022 (22 pages).
European search report,European Application No. 21199206.0, mailed Feb. 3, 2022 (7 pages).
Patent examination and approval,Taiwan, China Application No. 110136340, mailed Jul. 28, 2022 (5 pages).

* cited by examiner

S21
wheel acceleration of the target wheel may be sampled for N times from the first moment to a third moment to obtain N wheel acceleration values of the target wheel

S22
a rotation frequency value of the target wheel may be obtained according to the N wheel acceleration values obtained by sampling

S23
the first rotation angular position of the target wheel at the first moment may be acquired based on the rotation frequency value of the target wheel and the N wheel acceleration values

S24
the second rotation angular position of the target wheel at the second moment may be acquired based on the rotation frequency value of the target wheel, the first rotation angular position, and a time length between the first moment and the second moment

FIG. 2

S31
a real-time wheel acceleration value of the target wheel may be acquired, and a time length required to rotate for a preset number of revolutions of the target wheel may be calculated according to a first association relationship between the wheel acceleration and the time length required to rotate for the preset number of revolutions of the target wheel

S32
a time interval between any two adjacent sampling points may be obtained according to the time length required to rotate for the preset number of revolutions

S33
the wheel acceleration of the target wheel may be sampled once every the time interval starting from any time, to perform the sampling wheel acceleration of the target wheel for N times from the first moment to a third moment to obtain N wheel acceleration values of the target wheel

FIG. 3

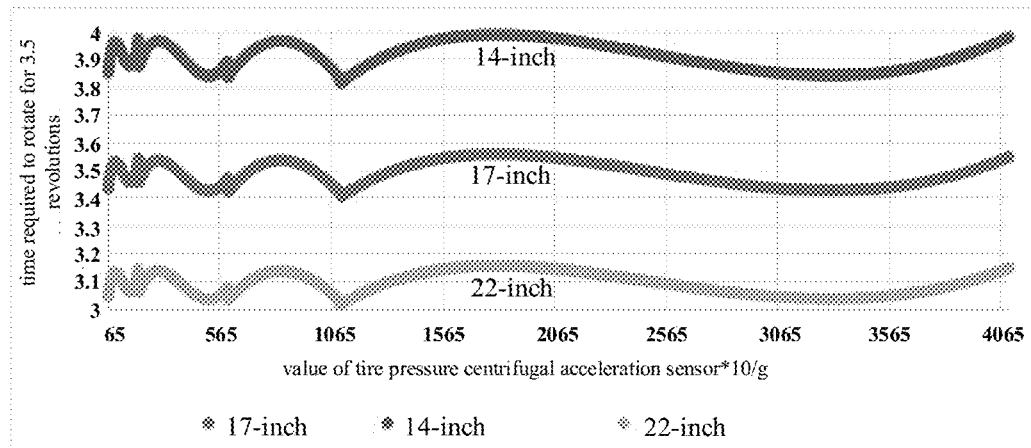

FIG. 4c

S221 averaging process may be performed for the N wheel acceleration values obtained by sampling, and N processed wheel acceleration values may be obtained

S222 a frequency domain processing may be performed for the N processed wheel acceleration values, to obtain a corresponding spectrogram

S223 a frequency value corresponding to a spectrum point with a maximum dB value in the spectrogram may be acquired, to serve as the rotation frequency value of the target wheel

FIG. 5a

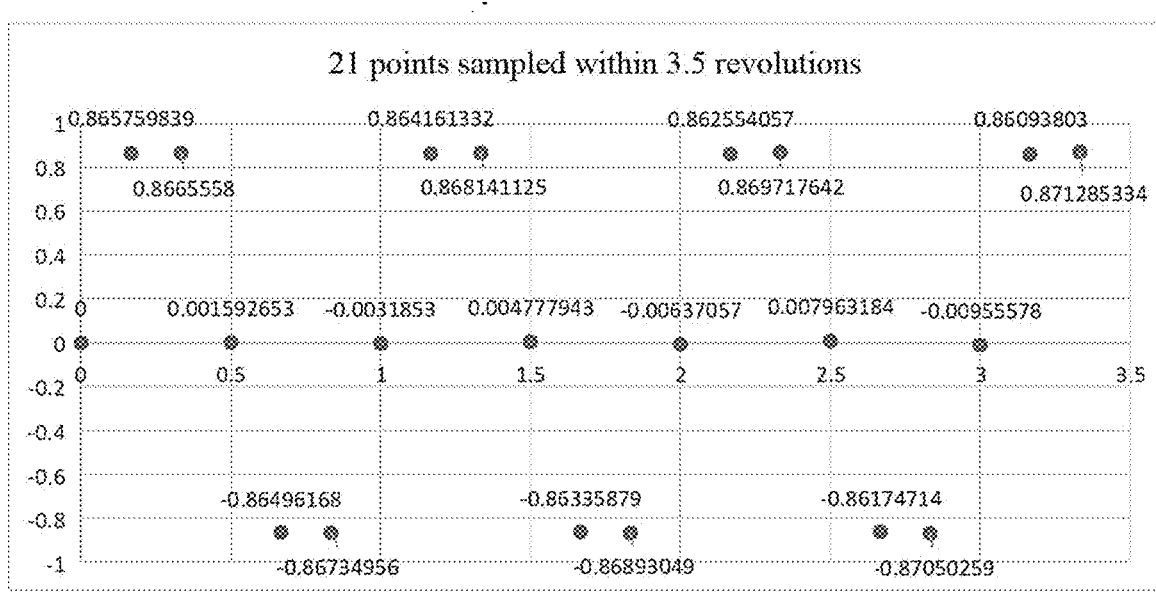
FIG. 5b
FIG. 5c
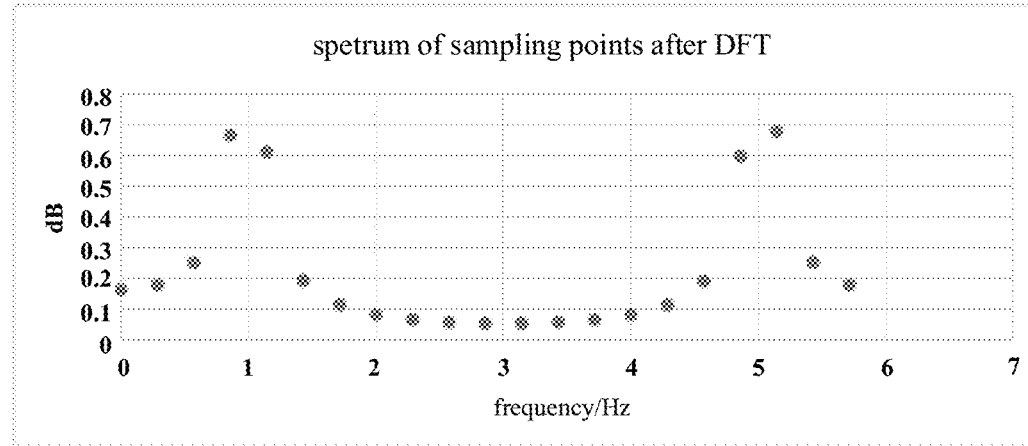
FIG. 6

METHOD FOR SAMPLING WHEEL ACCELERATION AND DETERMINING ROTATION ANGULAR POSITION OF WHEEL, AND TIRE PRESSURE MONITORING SYSTEM

CROSS REFERENCE TO RELATED APPLICATION

This application claims priority to Chinese Patent Application No. 202011085077.5, filed on Oct. 12, 2020 in the National Intellectual Property Administration of China, the contents of which are herein incorporated by reference in their entireties.

TECHNICAL FIELD

The described embodiments of the present disclosure relate to the technical field of vehicle electronics, and particularly to a method for sampling wheel acceleration, a method for determining rotation angular position of a wheel, a tire pressure monitoring system, and a storage device.

BACKGROUND

According to statistics, traffic accidents caused by tires on domestic highways account for 70% of the total number of accidents, and traffic accidents caused by punctures account for more than 42% of the total number of traffic accidents. In the United States, such ratios are higher, so that the US Federal Transportation Act requires that new cars manufactured after November 2003 should include tire pressure monitoring systems as standard configuration. In recent years, the Chinese government has paid great attention to traffic accidents caused by tires. In 2020, mandatory installation regulations was implemented in China, and all passenger cars in production required installation of direct or indirect tire pressure monitoring systems (hereinafter referred to as TPMSs).

For the TPMS products on the market, the current domestic technology is relatively backwards, and the biggest difference between the products lies in methods of positioning sensors on the vehicle body. Different positioning methods determine overall design ideas and architectures of the products, involving appearance structures, electronic designs, chipset composition, installation processes and costs, and the like. Domestic sensor positioning methods are generally divided into three categories as described below. The first category is physical position fixing. In particular, the sensors are installed in fixed tire positions, i.e., have been each fixed to a left front position, a right front position, a left rear position, and a right rear position, before leaving the factory, while receiving antennas are used in cooperation with the sensors. The design drawback is that four sensors in a set of products are clearly distinguished and can only be installed in unique positions, which increases the difficulty of production, installation labor time and subsequent maintenance costs. The second category is achieving the purpose of positioning through low-frequency communication, but to increase low-frequency communication, it is necessary to configure low-frequency receiving antennas. There are currently two practices on the market, i.e., configuration of four low-frequency receiving antennas and configuration of two low-frequency receiving antennas. Due to rather strict requirements for the low-frequency receiving antennas, such practices greatly increase the difficulty of installation and the product costs. The third category is achieving the purpose of positioning by increasing field strength of the left and right wheels. TPMS needs to include two acceleration sensors which point to a Z direction of a centrifugal force of the rotation of the tire and a tangential X direction of the rotation of the tire, respectively. The left and right wheels, due to presence of rotation of 180 degrees during the installation, have a phase lead and lag relationship in the Z and X directions, thereby making it possible to make a distinction between the left and right wheels. In the case that the receiver needs to be installed at a console position, a signal received from the front wheel will be stronger than a signal from the rear wheel. This method distinguishes hardware through a field strength method. Since actual vehicle conditions may vary over time, there is a risk of positioning errors, and higher requirements for product consistency will increase the product costs.

BRIEF DESCRIPTION OF THE DRAWINGS

FIG. 2 is a schematic flowchart of block S11 in FIG. 1a.

FIG. 3 is a schematic flowchart of a method for sampling wheel acceleration according to an embodiment of the present disclosure.

FIG. 4c is a graph of relationship of time length required to rotate for a fixed number of revolutions of wheels with different tire radiuses when a first association relationship corresponding to a wheel of 17-inch tire radiuses is adopted in a case.

FIG. 5a is a schematic flowchart of block S22 in FIG. 2.

FIG. 5b is a distribution diagram of data points of N centrifugal accelerations obtained by sampling during rotation for a preset number of revolutions of a wheel in a case.

FIG. 5c is a spectrum diagram obtained after performing a frequency domain processing for the data points in FIG. 5b in a case.

FIG. 6 is a schematic flowchart of block S23 in FIG. 2.

FIG. 7a is a schematic flowchart of block S12 in FIG. 1a.

FIG. 8 is a schematic flowchart of block S13 in FIG. 1a.

FIG. 9b is a schematic diagram of a framework of the tire pressure monitoring device 900 in FIG. 9a.

DETAILED DESCRIPTION

Solutions of embodiments of the present disclosure will be described below in detail in conjunction with the drawings of the description.

For the sake of illustration rather than limitation, specific details such as specific system structures, interfaces, and techniques are proposed in the following description to facilitate a thorough understanding of the present disclosure.

The terms "system" and "network" in the present disclosure are often used interchangeably herein. The term "and/or" in the present disclosure, which is only an association relationship describing associated objects, means that there can be three kinds of relationships. For example, A and/or B may mean that: A exists alone, A and B exist at the same time, and B exists alone. In addition, the symbol "I" in the present disclosure generally indicates that the associated objects before and after are in an "or" relationship. Further, "plural" herein means two or more than two.

Figure 1A:
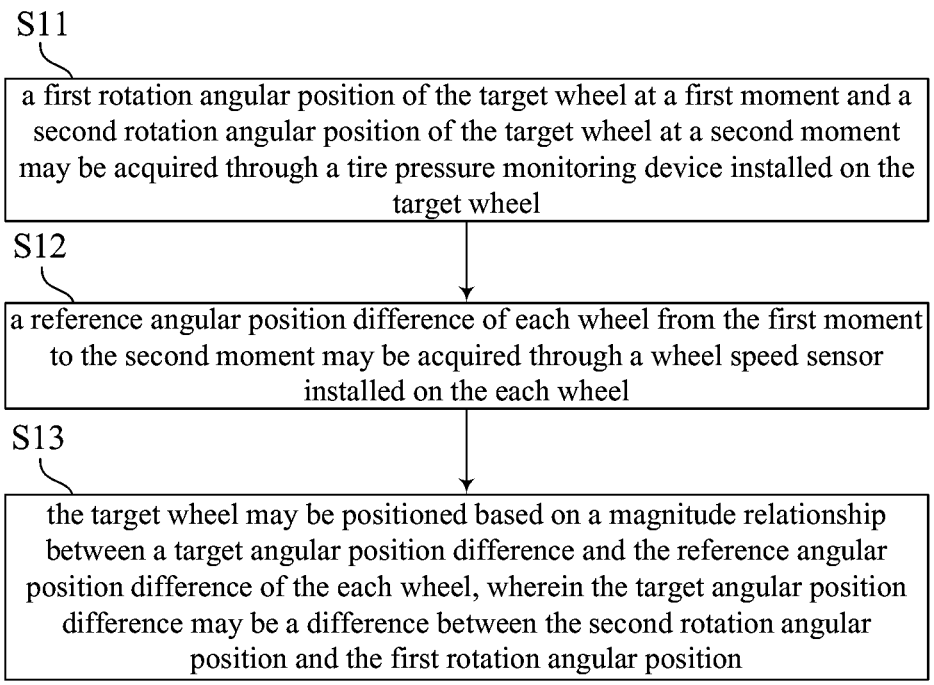
FIG. 1a is a schematic flowchart of a method for positioning a target wheel according to an embodiment of the present disclosure.

Reference is made to FIG. 1a, which is a schematic flowchart of a method for positioning a target wheel according to an embodiment of the present disclosure. Specifically, the method may include operations at the following blocks.

At block S11, a first rotation angular position of the target wheel at a first moment and a second rotation angular position of the target wheel at a second moment may be acquired through a tire pressure monitoring device installed on the target wheel.

Figure 1B:
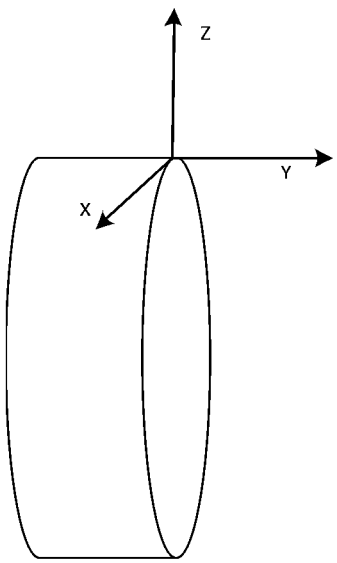
FIG. 1b is a schematic diagram of directions of wheel accelerations detected by an acceleration sensor.
Figure 1C:
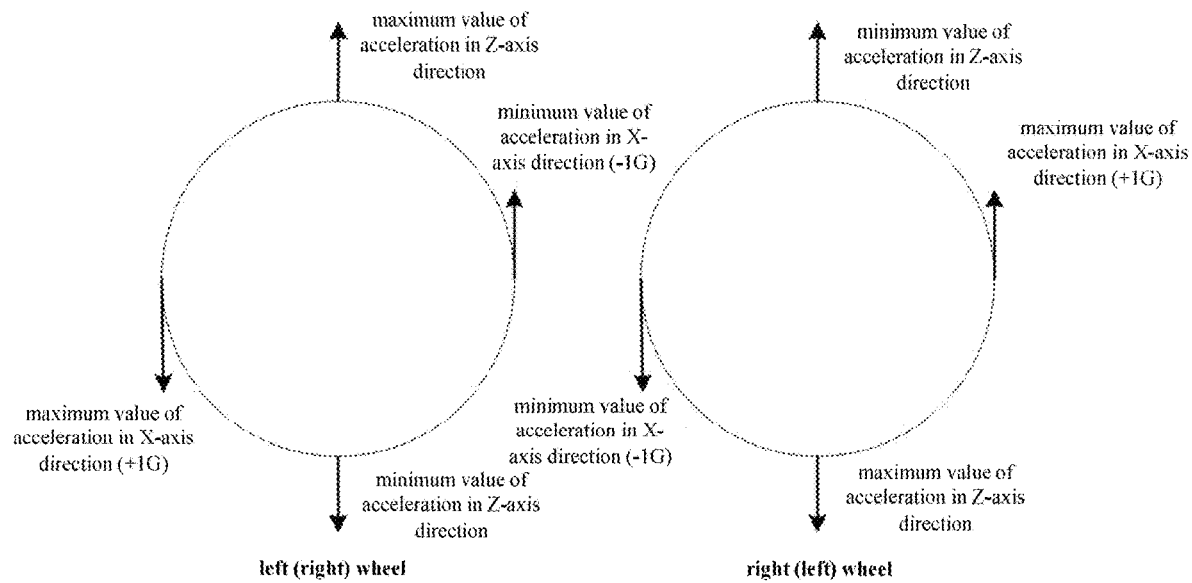
FIG. 1c is a schematic diagram of a magnitude relationship of wheel accelerations during rotation of wheels.
Figure 1D:
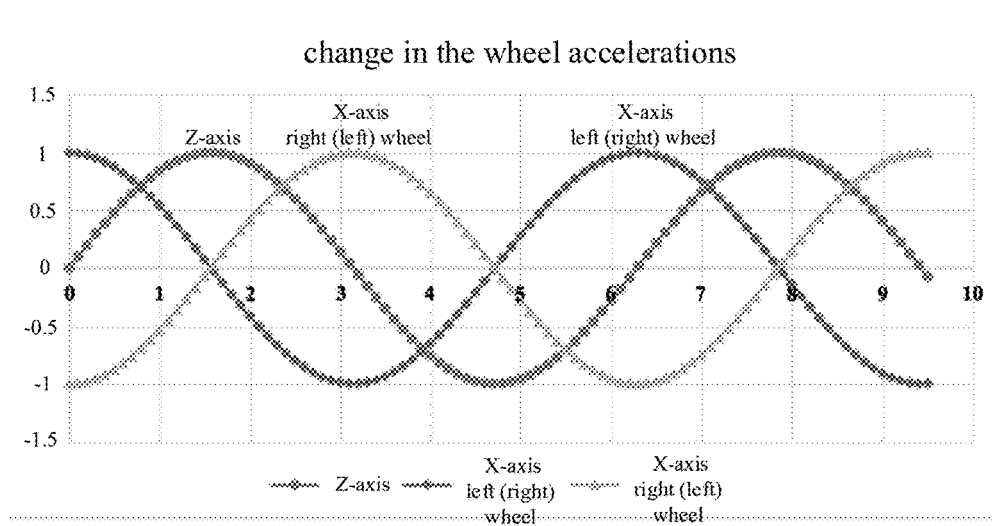
FIG. 1d is a graph of change in the wheel accelerations illustrating a phase relationship of wheels along an X-axis and a Z-axis.

Reference is specifically made to FIGS. 1b to 1d. FIG. 1b is a schematic diagram of directions of wheel accelerations detected by an acceleration sensor of the tire pressure monitoring device installed on the target wheel. FIG. 1c is a schematic diagram of a magnitude relationship of wheel accelerations during rotation of wheels. FIG. 1d is a graph of change in the wheel accelerations illustrating a phase relationship of wheels along an X-axis and a Z-axis. As shown in FIG. 1b, a centrifugal acceleration sensor may be configured to detect acceleration of a wheel in a centripetal direction, in other words, the centrifugal acceleration sensor may detect acceleration in a Z-axis direction. A tangential acceleration sensor may be configured to detect acceleration of the wheel in a tangential direction, in other words, the tangential acceleration sensor may detect acceleration in an X-axis direction. It could be understood that, when a vehicle is running, since a left wheel and a right wheel rotate in opposite directions, i.e., one wheel rotates clockwise and the other wheel rotates counterclockwise, as seen from a driver's perspective, the acceleration in the Z-axis direction and the acceleration in the X-axis direction may have a magnitude relationship as shown in FIG. 1c during the movement of the vehicle. It could be understood that, when the vehicle is moving forward, the left picture in FIG. 1c may be a schematic diagram of a magnitude relationship of accelerations of the left wheel during a rotation of the left wheel, the right picture in FIG. 1c may be a schematic diagram of a magnitude relationship of accelerations of the right wheel during a rotation of the right wheel. When the vehicle is backing up, it is just opposite to the above case, that is, the left picture in FIG. 1c may be a schematic diagram of a magnitude relationship of accelerations of the right wheel during the rotation of the right wheel, and the right picture in FIG. 1c may be a schematic diagram of a magnitude relationship of accelerations of the left wheel during the rotation of the left wheel. The present disclosure provides examples for illustration in the case that the vehicle is moving forward. Specifically, during one-revolution rotation of the left wheel, it may occur sequentially that: the acceleration in the X-axis direction reaches a maximum value, the acceleration in the Z-axis direction reaches a maximum value, the acceleration in the X-axis direction reaches a minimum value, and the acceleration in the Z-axis direction reaches a minimum value. However, during one-revolution rotation of the right wheel, it may occur sequentially that: the acceleration in the Z-axis direction reaches a maximum value, the acceleration in the X-axis direction reaches a maximum value, the acceleration in the Z-axis direction reaches a minimum value, and the acceleration in the X-axis direction reaches a minimum value.

According to the above relationships, acceleration sinusoids as shown in FIG. 1d may be generated from the acceleration sensors during the movement of the wheels. The formula of the acceleration sinusoids may be expressed as: $y=A*\sin(wt+\varphi)$. In the formula, y may be a wheel acceleration value at moment t, A maybe an amplitude value of the wheel acceleration, A may be theoretically 1 g (a gravitational acceleration) for a Z-axis acceleration sensor, w may be a rotation acceleration value of the wheel, and $\varphi$ may be a phase of a sinusoid at moment 0, i.e., an initial phase, and thus $(wt+\varphi)$ may be a rotation angular position of the wheel at the moment t. A first acceleration value of the target wheel at the first moment and a second acceleration value of the target wheel at the second moment can be acquired through the tire pressure monitoring device installed on the target wheel. In this way, the first rotation angular position of the target wheel at the first moment and the second rotation angular position of the target wheel at the second moment may be obtained according to the formula of the acceleration sinusoids described above.

Reference is made to FIG. 2, which is a schematic flowchart of block S11 in FIG. 1a. Specifically, the block S11 may include operations at the following blocks.

At block S21, wheel acceleration of the target wheel may be sampled for N times from the first moment to a third moment to obtain N wheel acceleration values of the target wheel. Each of the N wheel acceleration values may include at least one of a centrifugal acceleration component and a tangential acceleration component.

Reference is made to FIG. 3, which is a schematic flowchart of block S21 in FIG. 2. Specifically, the block S21 may include operations at the following blocks.

At block S31, a real-time wheel acceleration value of the target wheel may be acquired, and a time length required to rotate for a preset number of revolutions of the target wheel may be calculated according to a first association relationship between the wheel acceleration and the time length required to rotate for the preset number of revolutions of the target wheel.

Figure 4A:
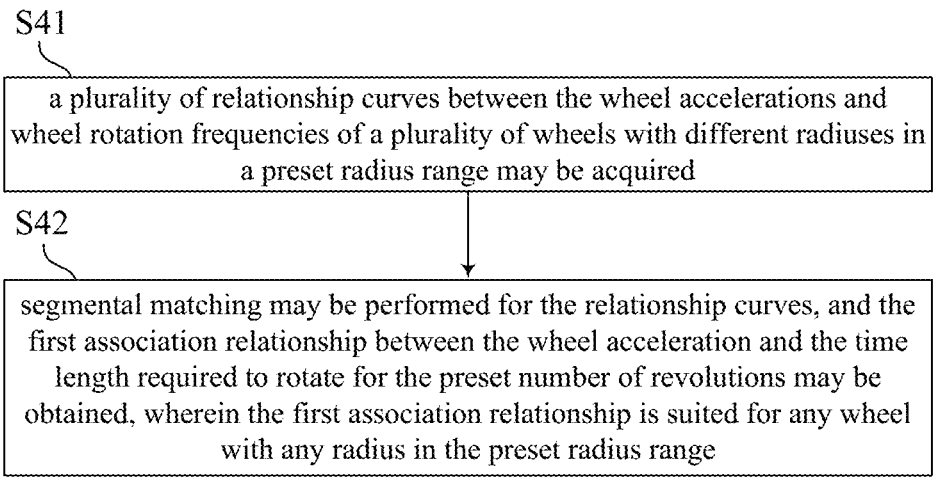
FIG. 4a is a schematic flowchart of a method for establishing a first association relationship according to an embodiment of the present disclosure.

Reference is made to FIG. 4a, which is a schematic flowchart of a method for establishing the first association relationship according to an embodiment of the present disclosure. In an embodiment, the method for establishing the first association relationship may include operations at the following blocks.

At block S41, a plurality of relationship curves between the wheel accelerations and wheel rotation frequencies of a plurality of wheels with different radiuses in a preset radius range may be acquired.

At block S42, segmental matching may be performed for the relationship curves, and the first association relationship between the wheel acceleration and the time length required to rotate for the preset number of revolutions may be obtained, wherein the first association relationship is suited for any wheel with any radius in the preset radius range.

The first association relationship may be: $T=P1*a^2+P2*a+P3$. T may be the time length required to rotate for the preset number of revolutions, a may be the wheel acceleration value of a wheel, and P1, P2, and P3 may all be constants.

Figure 4B:
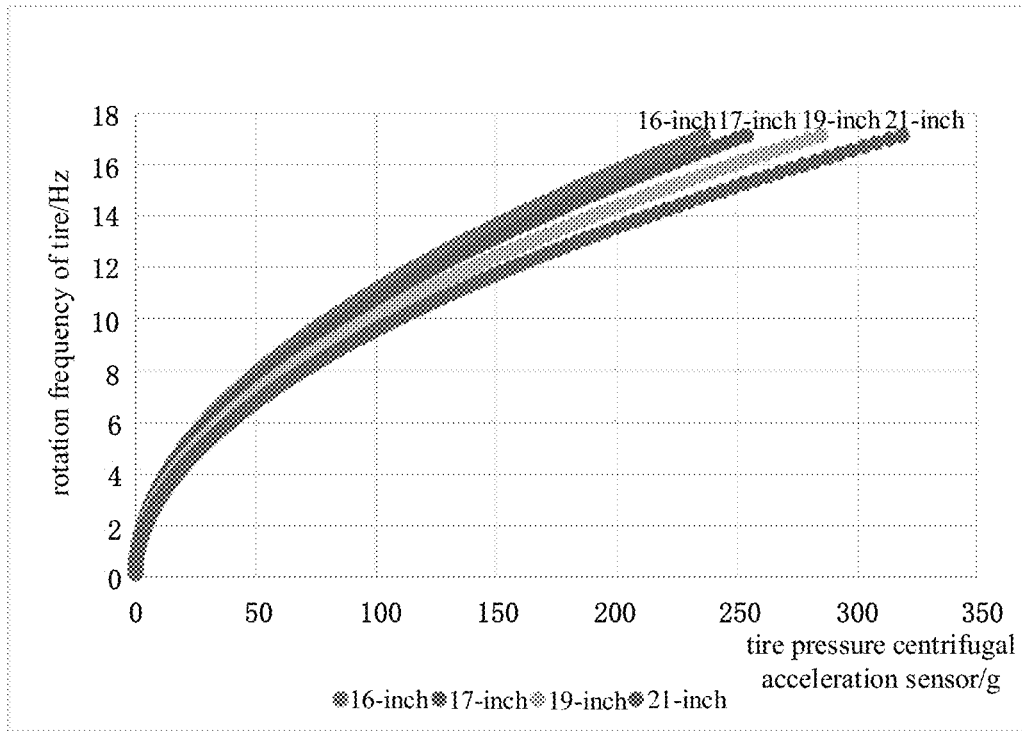
FIG. 4b is a graph of relationships between centrifugal acceleration values and rotation frequency values of wheels with different tire radiuses in a case.

Taking the wheel acceleration being the centrifugal acceleration as an example, it could be understood that, the wheels with different tire radiuses may satisfy a relationship between the centrifugal acceleration a and the rotation frequency f may be: $a=w^2*r=(2\pi f)^2*r$. In a case, the relationships between the centrifugal accelerations and the rotation frequencies corresponding to a plurality of wheels with different radiuses in a preset radius range may be put into statistics to obtain relationship curves as shown in FIG. 4b. The relationship curves in FIG. 4b may be subjected to the segmental matching, for example, portions of the relationship curves of FIG. 4b corresponding to the wheel acceleration values lying at an interval of 6.5 g to 400 g may be divided into four segments. Then the four segments of curves may be matched into a multi-order equation function, which may generally be a second-order equation, i.e., $T=P1*a^2+P2*a+P3$. In this second-order equation, T may be a time length required to rotate for the preset number of revolutions, a may be the wheel acceleration value of a wheel, and P1, P2, and P3 may be constants which may be related to the preset radius range of the wheel. Therefore, the first association relationship between the centrifugal acceleration and the time length required to rotate for the preset number of revolutions of the wheel may be $T=P1*a^2+P2*a+P3$.

In addition, it can be found that, if the above first association relationship is used for calculation under different tire radiuses, an error may be present in the obtained time length T required to rotate for the preset number of revolutions. As shown in FIG. 4c, for example, the preset number of revolutions is 3.5 revolutions and a standard tire radius is 17 inches. When the first association relationship under the 17-inch tire radius is also used in a case of a 14-inch tire radius, a time length T obtained will be greater than an actual time length required to rotate for 3.5 revolutions, and when the first association relationship under the 17-inch tire radius is also used in a case of a 22-inch tire radius, a time length T obtained will be smaller than the actual time length required to rotate for 3.5 revolutions. However, both the time length T above may still lie between a time length required to rotate for 3 revolutions to a time length required to rotate for 4 revolutions. Therefore, in this embodiment, a same second order equation function can be used as the first association relationships under different tire radiuses so as to reduce input parameters, that is, it is not needed to calculate each tire radius to obtain a corresponding first association relationship.

Therefore, the time length required to rotate for the preset number of revolutions may be obtained through a calculation by substituting a value of the real-time wheel acceleration value a0 into the first association relationship between the wheel acceleration and the time length required to rotate for the preset number of revolutions of the wheel.

At block S32, a time interval between any two adjacent sampling points may be obtained according to the time length required to rotate for the preset number of revolutions.

At block S33, the wheel acceleration of the target wheel may be sampled once every the time interval starting from any time, to perform the sampling wheel acceleration of the target wheel for N times from the first moment to a third moment to obtain N wheel acceleration values of the target wheel.

It can be found that, in the above-mentioned method for sampling the wheel acceleration, the time length required to rotate for the preset number of revolutions may be calculated through the first association relationship between the wheel acceleration and the time length required to rotate for the preset number of revolutions of the wheel, such that after the number of times of sampling the wheel acceleration required during the process of rotating for the preset number of revolutions is determined, the time interval between any two adjacent sampling points may be directly determined according to the real-time wheel acceleration value of the target wheel. It could be understood that the number of times of sampling can be determined as required, for example, may be 12 times, 21 times, 24 times, 33 times, or the like. In addition, the time interval between each two adjacent samplings may be identical. Therefore, after the time length required to rotate for the preset number of revolutions is calculated, the time interval Δt between any two sampling points may further be obtained. Accordingly, in the above block S21, the wheel acceleration of the target wheel may be sampled once every time interval Δt, starting from the first moment, by using the above method for sampling the wheel acceleration, in this way, N wheel acceleration values may be obtained.

In an embodiment, serial numbers of sampling points for recording sampled wheel acceleration values may be labelled as P1 to Pn. In other words, sampling points may be labelled as P1, P2, P3 . . . , Pn in sequence starting from a first sampling point. For example, P1=0, P2=1, P3=2 . . . and so on, and corresponding wheel acceleration values may be a0, a1, a2 . . . . In order to facilitate subsequent calculation, each of the wheel acceleration values can be subtracted from a first wheel acceleration value, so the N wheel acceleration values actually saved may be a0–a0, a1–a0 . . . a(N–1)–a0.

At block S22, a rotation frequency value of the target wheel may be obtained according to the N wheel acceleration values obtained by sampling.

Specifically, reference is made to FIG. 5a, which is a schematic flowchart of the block S22 in FIG. 2. In an embodiment, the above block S22 may specifically include operations at blocks as follows.

At block S221, averaging process may be performed for the N wheel acceleration values obtained by sampling, and N processed wheel acceleration values may be obtained;

At block S222, a frequency domain processing may be performed for the N processed wheel acceleration values, to obtain a corresponding spectrogram.

At block S223, a frequency value corresponding to a spectrum point with a maximum dB value in the spectrogram may be acquired, to serve as the rotation frequency value of the target wheel.

The averaging process may be performed for the N wheel acceleration values sampled and saved as (a(N–1)–a0), such that all obtained data may evenly distribute around 0. In other words, a median line of an ordinate of a set of the obtained data may be moved to 0. Then the averaged wheel acceleration values (a(N–1)–a0) may be subjected to a time domain-to-frequency domain processing to obtain the corresponding spectrogram. From the spectrogram, the rotation frequency value f during the sampling may be obtained. The rotation frequency value f during the sampling may be a frequency value of a spectrum point corresponding to a point with a maximum dB value in the spectrograms.

In an embodiment, the preset number may be P which may be smaller than or equal to N. The above block S223 may specifically include the following operations. When P is an integer number, a frequency value corresponding to the P-th spectrum point in the spectrogram may be acquired, to serve as the rotation frequency value of the target wheel. When P is a non-integer number, a first frequency value corresponding to a first spectrum point with an integer serial number in the spectrogram less than the non-integer number P and nearest to the non-integer number P, and a second frequency value corresponding to a second spectrum point with an integer serial number in the spectrogram larger than the non-integer number P and nearest to the non-integer number P may be acquired, and then the rotation frequency value of the target wheel may be obtained by performing a weighting processing for the first frequency value and the second frequency value.

In a case, the preset number P is 3.5, and N is 21. 21 wheel accelerations sampled within 3.5 revolutions are shown in FIG. 5b. After a discrete fourier transform (DFT) operation or a fast fourier transform (FFT) operation being performed for 21-wheel accelerations in FIG. 5b, a spectrogram of 21 data points as shown in FIG. 5c can be obtained. A point with the maximum dB value may be the 3.5th point, that is, a frequency value of the 3.5th point is a sinusoidal frequency value of sampled data in FIG. 5b. However, the frequency value of the 3.5th point is difficult to be obtained directly from FIG. 5c, frequency values of the third point and the fourth point can be obtained in FIG. 5c. A frequency value of the third point is F3=3/N/Δt, a frequency value of the fourth point is F4=4/N/Δt, a dB value of the third point is M3, and a dB value of the fourth point is M4. A frequency value of a spectrum point corresponding to a point (the 3.5th point) with the maximum dB value can be obtained by performing a weighting processing for the frequency value of the third point and the frequency value of the fourth point, which is the rotation frequency value f of the target wheel= (F3*M3+F4*M4)/(M3+M4).

At Block S23, the first rotation angular position of the target wheel at the first moment may be acquired based on the rotation frequency value of the target wheel and the N wheel acceleration values.

Specifically, reference is made to FIG. 6, which is a schematic flowchart of the block S23 in FIG. 2. In an embodiment, the above block S23 may specifically include operations at the following blocks.

At block S231, a second association relationship between wheel acceleration values obtained by sampling and sampling moments may be acquired, based on the rotation frequency value of the target wheel. The second association relationship may be y=A*sin (2πf*t+φ1). In the second association relationship, t may be any sampling moment starting from the first moment, y may be a corresponding wheel acceleration value obtained by sampling at the sampling moment t, A may be a variation amplitude of the wheel acceleration, f may be the rotation frequency value of the target wheel, and φ1 may be a phase of the wheel acceleration at the first moment.

Since the formula of the acceleration sinusoid of the wheel in the movement may be y=A*sin (wt+φ), and w=2πf, when the sampling is started at the first moment, the wheel acceleration y obtained at any sampling moment may be expressed as: y=A*sin (2πf*t+φ1). t may be any sampling moment starting from the first moment, y may be the corresponding wheel acceleration value obtained by sampling at the sampling moment t, A may be the variation amplitude of the wheel acceleration, f may be the rotation frequency value of the target wheel, and φ1 may be the phase of the wheel acceleration at the first moment. That is, the second association relationship between the wheel acceleration obtained by sampling and the corresponding sampling moment can be acquired according to the rotation frequency value of the target wheel.

At block S232, the first rotation angular position may be acquired based on the N wheel acceleration values obtained by sampling, corresponding sampling moment of the N wheel acceleration values, and the second association relationship.

Specifically, an optimal solution of a phase φ1 of the wheel acceleration at the first moment may be obtained to serve as the first rotation angular position through substituting each of the N wheel acceleration values obtained by sampling and a corresponding sampling moment of the each of the N wheel acceleration values into the second association relationship respectively, and using a least square algorithm.

(a(N−1)−a0)=A*sin (2πf*Δt*N+φ1) may be obtained by substituting the averaged acceleration values (a(N−1)−a0) into the second association relationship, and then the least square algorithm may be used to obtain the optimal solution of the initial phase φ1 which is the first rotation angular position of the target wheel at the first moment.

At block S24, the second rotation angular position of the target wheel at the second moment may be acquired based on the rotation frequency value of the target wheel, the first rotation angular position, and a time length between the first moment and the second moment. The second moment may be earlier than or the same as the third moment.

In an embodiment, at the above block S24, specifically, the second rotation angular position may be obtained according to a third association relationship between the first rotation angular position and the second rotation angular position. The third association relationship may be: φ2=2πf*t'+φ1. f may be the rotation frequency value of the target wheel, t' may be the time length between the first moment and the second moment, φ1 may be the first rotation angular position, and φ2 may be the second rotation angular position.

From the second association relationship between the wheel acceleration and the sampling moment, it can be learned that, the second rotation angular position φ2 of the target wheel at the second moment and the first rotation angular position φ1 of the target wheel at the first moment may satisfy a third association relationship: φ2=2πf*t'+φ1. f may be the rotation frequency value of the target wheel, t' may be the time length between the first moment and the second moment, φ1 may be the first rotation angular position, and φ2 may be the second rotation angular position. Therefore, the second rotation angular position may be determined according to the rotation frequency value of the target wheel, the first rotation angular position, and the time length between the first moment and the second moment.

Further, the time length between the second moment and the first moment may be equal to a time length between the third moment and the second moment.

It could be understood that, in order to avoid the situation that the wheel acceleration values monotonously increase or monotonously decrease during sampling from affecting the sampled data, a midpoint between the first moment and the third moment can be used as an end point of the sampling, so as to reduce the data error. In other words, the time length between the second moment and the first moment may be equal to the time length between the third moment and the second moment.

Therefore, at the above block S11, the first rotation angular position of the target wheel at the first moment and the second rotation angular position of the target wheel at the second moment may be acquired through the tire pressure monitoring device installed on the target wheel, by using the method for determining rotation angular position of a wheel.

At block S12, a reference angular position difference of each wheel from the first moment to the second moment may be acquired through a wheel speed sensor installed on each wheel.

It could be understood that the wheel speed sensor of the present disclosure can be an anti-lock braking system (ABS) speed sensor. The ABS speed sensor may include two parts, namely, a ring gear turntable and an inductive sensor. The ring gear turntable may be fixed on a wheel shaft. The inductive sensor may be fixed near the ring gear turntable and may not rotate along with the wheel. The inductive sensor may generally be a Hall sensor or a photoelectric sensor. Therefore, during the rotation of the wheel, the ring gear turntable can rotate along with the wheel, while the inductive sensor may not rotate. Thus, the inductive sensor can output a set of sinusoidal alternating current signals by interacting with the ring gear turntable during the rotation of the ring gear turntable along with the each wheel (i.e., the wheel speed sensor of the each wheel may output pulses), and the frequency thereof may be related to the wheel speed. Therefore, a change value of a rotation angular position generated by the rotation of the wheel from the first moment to the second moment may be acquired according to the output sinusoidal alternating current signals, and may serve as the reference angular position difference. That is, the reference angular position difference of each wheel between the first moment and the second moment may be acquired through the wheel speed sensor installed on each wheel.

Figure 7A:
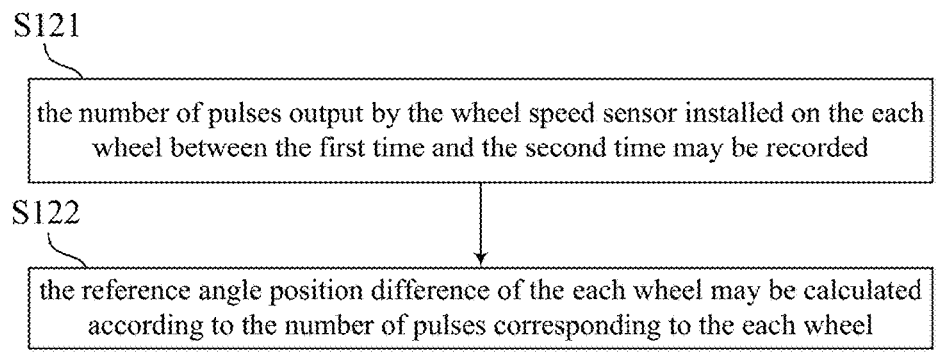

Specifically, reference is made to FIG. 7a, which is a schematic flowchart of the block S12 in FIG. 1a. In an embodiment, the above block S12 may specifically include operations at the following blocks.

At block S121, the number of pulses output by the wheel speed sensor installed on the each wheel from the first moment to the second moment may be recorded.

Block S122: the reference angular position difference of each wheel may be calculated according to the number of pulses corresponding to the each wheel.

Figure 7B:
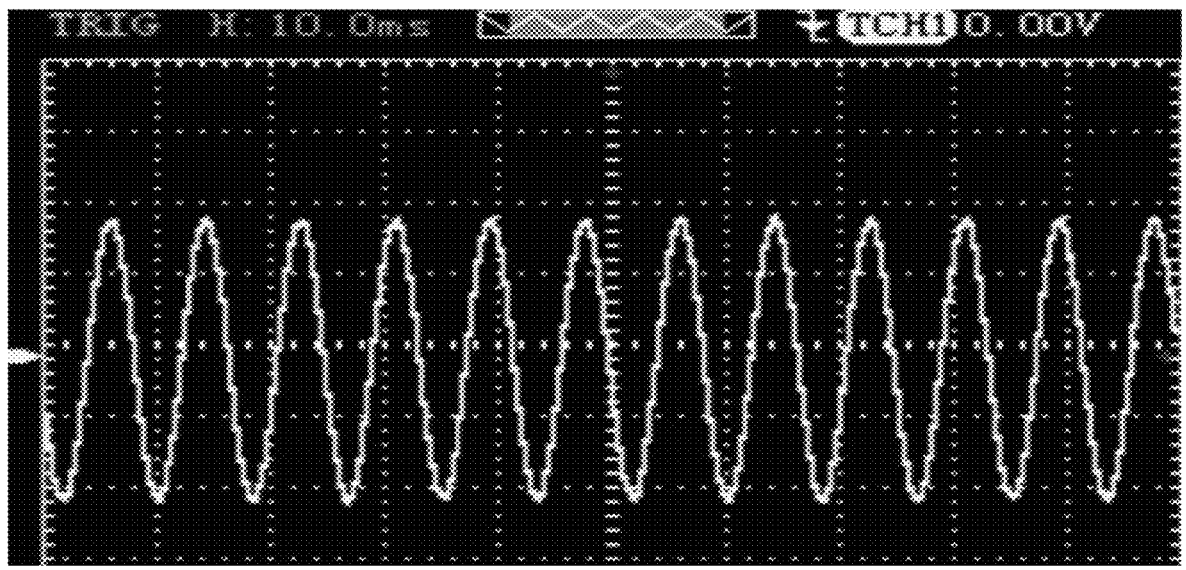
FIG. 7b is a waveform diagram output from a wheel speed sensor when a wheel is in rotation.

It could be understood that, when the wheel is in rotation, the ABS speed sensor may output a waveform as shown in FIG. 7b. A conversion into the rotation frequency value f may be achieved by counting the number of pulses. A conversion relationship may be: the rotation frequency value f=fx/DIV. In this relationship, fx may be a frequency value of the waveform output by the ABS speed sensor and shown in FIG. 7b. DIV may be the number of gears of the ring gear turntable. Therefore, an angle by which the tire rotates, i.e., the reference angular position difference $\Delta\varphi$ may be determined by recording the number M of pulses from the first moment t1 to the second moment t2. In particular, $\Delta\varphi=((M \% DIV)/DIV)*360°$.

At block S13, the target wheel may be positioned based on a magnitude relationship between a target angular position difference and the reference angular position difference of the each wheel, wherein the target angular position difference may be a difference between the second rotation angular position and the first rotation angular position.

It could be understood that, when the vehicle is driving along a straight line, hourly tire speeds of all the wheels may remain identical. However, differences in actual tire manufacturing processes of the vehicle or tire wear degrees may result in slight differences between radiuses of any two tires. In one embodiment, assuming that a radius of the left front tire is 0.388 m, a radius of the right front tire is 0.39 m, a radius of the left rear tire is 0.392 m, and a radius of the right rear tire is 0.394 m, when hourly speed of the vehicle is 50 km/h, results shown in the following table may be obtained by counting the number of pulses output within 60 seconds via the ABS speed sensor and converting it into a phase change.

|  | hourly speed (km/h) | tire radius (m) | rotation speed (rotation/s) | initial phase | phase at 1 s | phase at 10 s | phase at 30 s | phase at 60 s |
| --- | --- | --- | --- | --- | --- | --- | --- | --- |
| left front | 50 | 0.388 | 5.70001678 | 0 | 252.006041 | 0.060411 | 0.18123317 | 0.362466 |
| right front | 50 | 0.39 | 5.67078593 | 0 | 241.482933 | 254.8293 | 44.4879961 | 88.97599 |
| left rear | 50 | 0.392 | 5.64185334 | 0 | 231.067204 | 150.672 | 92.0161185 | 184.0322 |
| right rear | 50 | 0.394 | 5.61321449 | 0 | 220.757218 | 47.57218 | 142.716544 | 285.4331 |

Through long-term accumulation, it can be found that large phase differences may be present between tires of different wheels of the same vehicle.

Therefore, with regard to a same wheel, a difference between the target angular position difference and the reference angular position difference should be a minimum, and the difference between the target angular position difference and the reference angular position difference of the same wheel should be constant over time. With regard to different wheels, a difference between a target angular position difference of wheel A and a reference angular position difference of wheel B should be larger, and the difference between the target angular position difference of the wheel A and the reference angular position difference of the wheel B should be always changing over time. Therefore, during the vehicle running, which wheel is the exact target wheel can be judged by comparing the magnitude relationship between the target angular position difference and each reference angular position difference corresponding to the each wheel multiple times, i.e., positioning the target wheel can be achieved.

Figure 8:
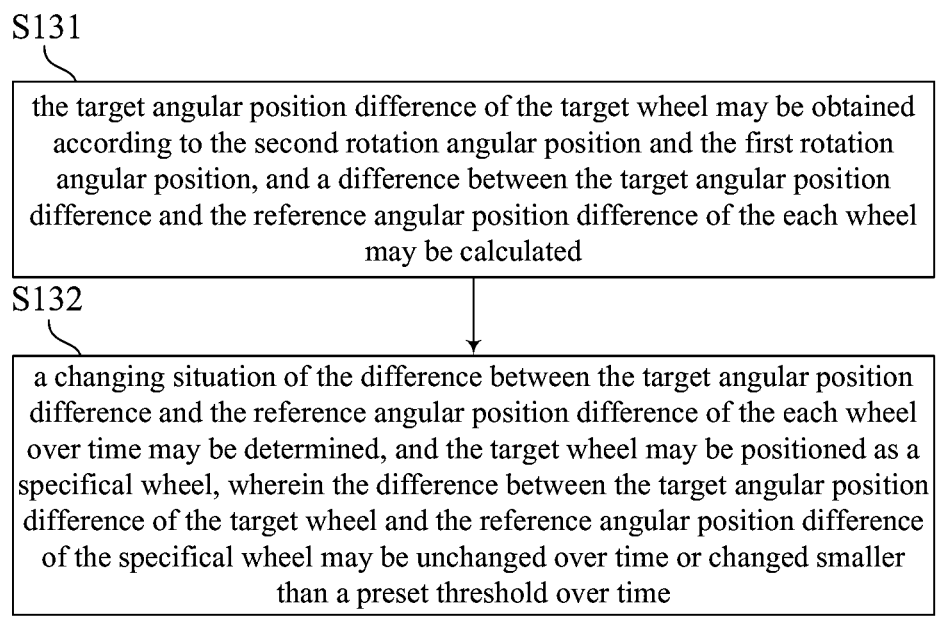

Specifically, reference is made to FIG. 8, which is a schematic flowchart of the block S13 in FIG. 1a. In an embodiment, the above block S13 may specifically include operations at the following blocks.

At block S131, the target angular position difference of the target wheel may be obtained according to the second rotation angular position and the first rotation angular position, and a difference between the target angular position difference and the reference angular position difference of each wheel may be calculated.

At block S132, a changing situation of the difference between the target angular position difference and the reference angular position difference of each wheel over time may be determined, and the target wheel may be positioned as a specifical wheel, wherein the difference between the target angular position difference of the target wheel and the reference angular position difference of the specifical wheel may be unchanged over time or changed smaller than a preset threshold over time.

It could be understood that the target angular position difference of the target wheel from the first moment to the second moment may be obtained according to the second rotation angular position and the first rotation angular position, and then the difference between the target angular position difference and the reference angular position difference corresponding to each wheel can be calculated. With regard to a same wheel, the difference between the target angular position difference of the wheel and the reference angular position difference should be constantly unchanged over time. However, since an error may be present in the actual application, a change in the difference between the target angular position difference of the wheel and the reference angular position difference should be smaller than a preset threshold which may be set according to an error range in the actual application. With regard to different wheels, a difference between a target angular position difference of wheel A and a reference angular position difference of wheel B may vary, and a variation range of the difference between the target angular position difference of the wheel A and the reference angular position difference of the wheel B may be greater than or equal to the preset threshold. Therefore, whether the difference between the target angular position difference and the reference angular position difference corresponding to the each wheel varies over time should be determined and the target wheel may be positioned as a specifical wheel, wherein the difference between the target angular position difference of the target wheel and the reference angular position difference of the specifical wheel may be unchanged over time or changed smaller than the preset threshold over time.

Figure 9A:
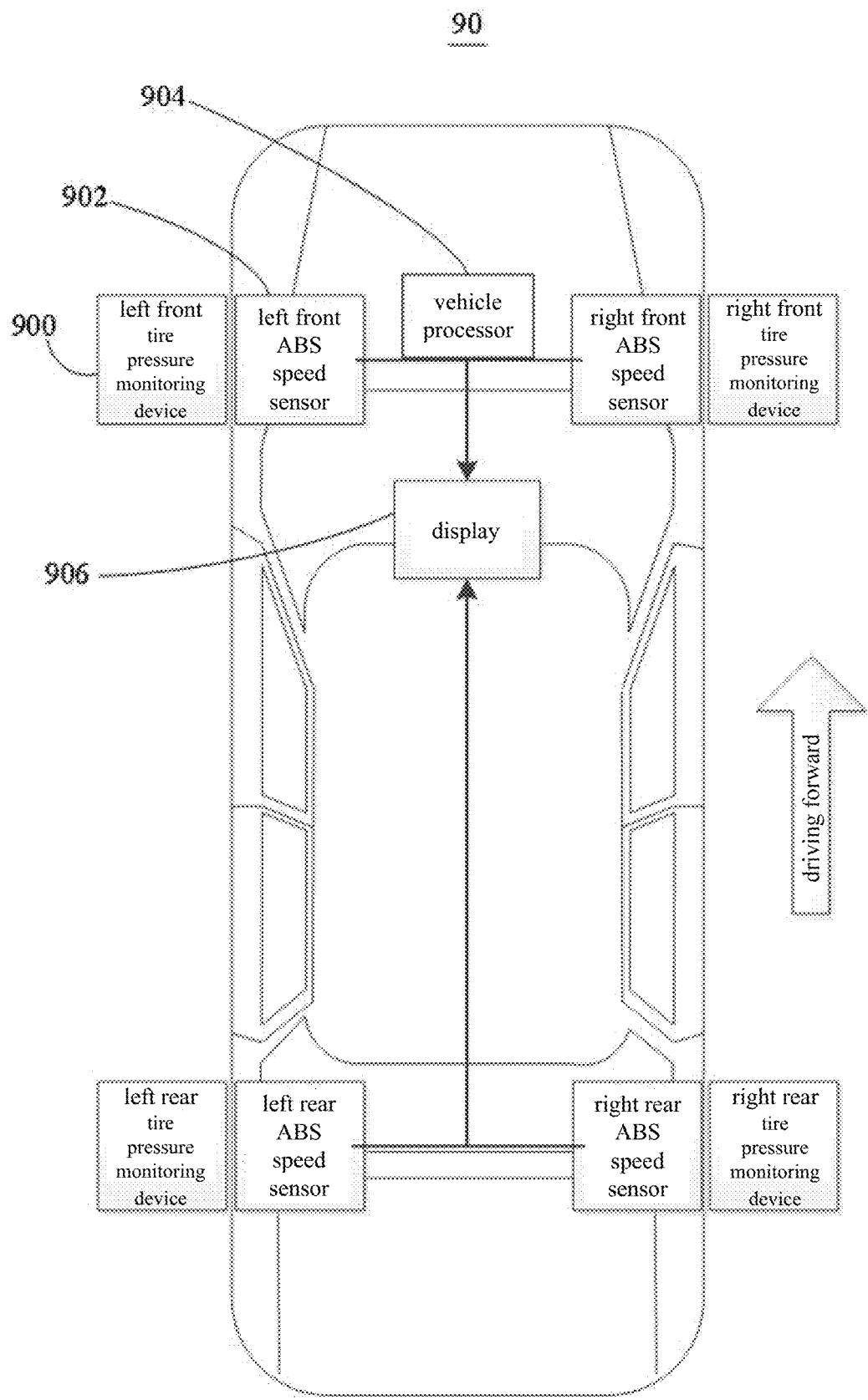
FIG. 9a is a schematic diagram of a framework of a tire pressure monitoring system according to an embodiment of the present disclosure.

Reference is made to FIG. 9a, which is a schematic diagram of a framework of a tire pressure monitoring system according to an embodiment of the present disclosure. A tire pressure monitoring system 90 may include at least one tire pressure monitoring device 900, a plurality of wheel speed sensors 902, a vehicle processor 904, and a display 906 coupled to one another. Each of the at least one tire pressure monitoring device 900 may be installed on a corresponding target wheel of a vehicle and may be configured to acquire pressure data of the corresponding target wheel, a first rotation angular position of the corresponding target wheel at a first moment, and a second rotation angular position of the corresponding target wheel at a second moment, and to send the pressure data of the corresponding target wheel, the first rotation angular position of the corresponding target wheel at the first moment, and the second rotation angular position of the corresponding target wheel at the second moment to the vehicle processor 904. The plurality of wheel speed sensors 902 may be installed on all wheels of the vehicle in a one-to-one correspondence. Specifically, each of the plurality of wheel speed sensors 902 may be configured to acquire a reference angular position difference of a corresponding wheel between the first moment and the second moment, and to send the reference angular position difference of the corresponding wheel between the first moment and the second moment to the vehicle processor 904. The vehicle processor 904 may be configured to position the corresponding target wheel based on a magnitude relationship between a target angular position difference and the reference angular position difference of each wheel, and to control the display 906 such that the display 906 may display a positioning result and the pressure data of the corresponding target wheel. In particular, the target angular position difference may be a difference between the second rotation angular position and the first rotation angular position. It could be understood that each wheel of the vehicle may be equipped with a tire pressure monitoring device 900 and a wheel speed sensor 902, so as to realize a positioning of the each wheel.

The target angular position difference may be a change value of rotation angular position acquired by the tire pressure monitoring device 900 and generated by the target wheel from the first moment to the second moment, and the reference angular position difference may be a change value of rotation angular position acquired by the wheel speed sensor 902 and generated by each wheel from the first moment to the second moment. With regard to a same wheel, the target angular position difference and the reference angular position difference may keep unchanged over time. With regard to different wheels, a magnitude of the difference between the target angular position difference and the reference angular position difference may always change over time. Therefore, a wheel speed sensor 902 installed on which wheel is corresponding to the tire pressure monitoring device 900 may be determined by comparing the target angular position difference with the reference angular position difference of each wheel. That is, the positioning of the target wheel with the tire pressure monitoring device 900 being installed on can be realized. The present disclosure is implemented mainly through algorithms, and has low product costs and subsequent maintenance costs.

For details of the present disclosure concerning positioning the target wheel by the vehicle processor 904, see the contents in the above embodiments relating to the method for positioning a target wheel. It will not be repeated here.

Figure 9B:
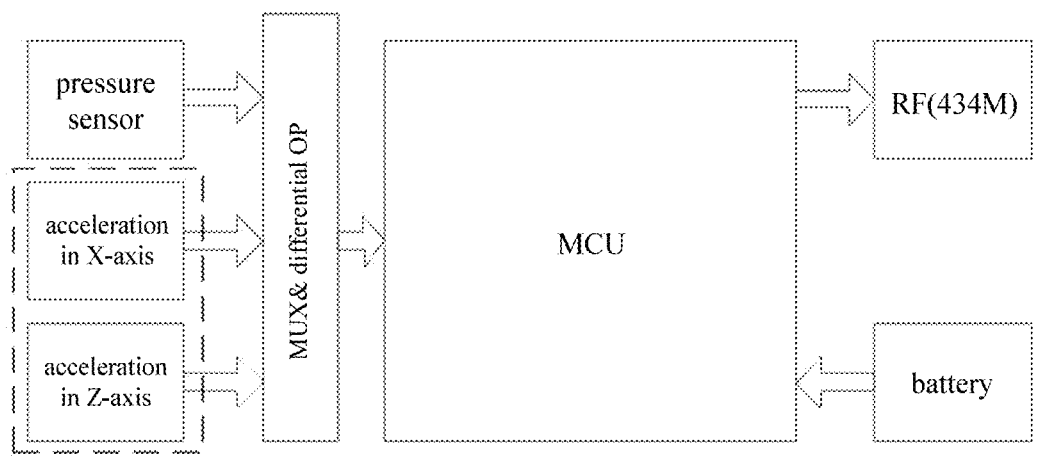

In this embodiment, as shown in FIG. 9b, each tire pressure monitoring device 900 may include a tire pressure monitoring chip and a battery. The tire pressure monitoring chip may include a pressure sensor, an acceleration sensor (which may include an X-axis acceleration sensor and a Z-axis acceleration sensor), a controller, and a radio frequency emitter. Specifically, the controller can be an MCU (microcontroller unit) and powered by the battery. The pressure sensor and the acceleration sensor may couple to the MCU via a multiplexer MUX, a differential amplifier circuit, and the like. The radio frequency emitter may employ a 434M antenna for data transmission and may transmit the data to the vehicle processor 904.

Further, the display 906 may include a plurality of alarm lights having a one-to-one correspondence with the plurality of tires. The vehicle processor 904 may further be configured to control an alarm light corresponding to a tire to light up, when a tire pressure of the tire is not in a preset range. Specifically, the display 906 may display a tire pressure of a left front wheel, a tire pressure of a left rear wheel, a tire pressure of a right front wheel, and a tire pressure of a right rear wheel. The display 906 may be provided with a left front wheel alarm light, a left rear wheel alarm light, a right front wheel alarm light, and a right rear wheel alarm light corresponding thereto. When the tire pressure of a tire is too high or too low, the vehicle processor 904 may control an alarm light corresponding to the tire to light up and give an alarm.

Specifically, the vehicle processor 904 may also be referred to as a CPU (Central Processing Unit). The vehicle processor 904 may be an integrated circuit chip with a signal processing capability. The vehicle processor 904 may also be a general-purpose processor, a digital signal processor (DSP), an application specific integrated circuit (ASIC), a field-programmable gate array (FPGA), or other programmable logic means, a discrete gate, a transistor logic means, or a discrete hardware component. The general-purpose processor may be a microprocessor or any conventional processor or the like. In addition, the vehicle processor 904 may be implemented jointly by the integrated circuit chip.

Figure 10:
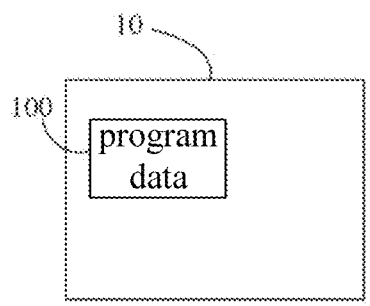
FIG. 10 is a schematic diagram of a framework of a storage device according to an embodiment of the present disclosure.

Reference is made to FIG. 10, which is a schematic diagram of a framework of a storage device according to an embodiment of the present disclosure. A storage device 10 may be a non-transitory computer-readable storage medium that may store program data 100 capable of being called by and running in a processor. When the program data is called by the processor and runs in the processor, the method for positioning a target wheel in any of the foregoing embodiments can be implemented.

In the several embodiments provided in the present disclosure, it should be understood that, the disclosed method, system, and device may be implemented in other ways. For example, the device implementation manner described above is only illustrative. For example, division of modules or units is only division of logical functions, and other division manners are allowed in actual implementation. For example, units or components may be combined or integrated into another system, or some features may be ignored, or may not be implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separate, and the components displayed as units may or may not be physical units, that is, they may be located in one place, or they may be distributed on network units. Some or all of the units may be selected according to actual needs to achieve the purpose of the solutions of the present embodiments.

Furthermore, the respective functional units in the various embodiments of the present disclosure may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in a computer-readable storage medium. Based on this understanding, the technical solutions of the present disclosure essentially or the part that contributes to the existing technology or all or part of the technical solutions may be embodied in the form of a software product, and the computer software product is stored in a storage medium, including a number of instructions to cause a computer device (which can be a personal computer, a server, a network device, or the like) or a processor to perform all or part of the steps of the methods in the various embodiments of the present disclosure. The aforementioned storage media include: U disk, mobile hard disk, read-only memory (ROM), random access memory (RAM), magnetic disk, optical disk and other media that can store program codes.

What is claimed is:

1. A method for sampling wheel acceleration, comprising:
   acquiring, through a tire pressure monitoring device installed on a target wheel, a real-time wheel acceleration value of the target wheel and calculating a time length required to rotate for a preset number of revolutions of the target wheel according to a first association relationship between the wheel acceleration and the time length required to rotate for the preset number of revolutions of the target wheel;
   obtaining a time interval between any two adjacent sampling points according to the time length required to rotate for the preset number of revolutions; and
   sampling the wheel acceleration of the target wheel once at every time interval starting from any time,
   wherein the first association relationship is established by a means, which comprises:
      obtaining a plurality of relationship curves between wheel accelerations and wheel rotation frequencies of a plurality of wheels with different radiuses in a preset radius range; and
      performing segmental matching for the relationship curves, and obtaining the first association relationship between the wheel acceleration and the time length required to rotate for the preset number of revolutions, wherein the first association relationship is suited for any wheel with any radius in the preset radius range.

2. A method for determining rotation angular position of a wheel, comprising:
   sampling wheel acceleration of a target wheel for N times from a first moment to a third moment to obtain N wheel acceleration values of the target wheel by using the method for sampling wheel acceleration as claimed in claim 1, wherein each of the N wheel acceleration values comprises at least one of a centrifugal acceleration component and a tangential acceleration component;
   obtaining a rotation frequency value of the target wheel according to the N wheel acceleration values obtained by sampling;
   acquiring a first rotation angular position of the target wheel at the first moment based on the rotation frequency value of the target wheel and the N wheel acceleration values; and
   acquiring a second rotation angular position of the target wheel at a second moment based on the rotation frequency value of the target wheel, the first rotation angular position, and a time length between the first moment and the second moment;
   wherein the second moment is earlier than or the same as the third moment.

3. The method as claimed in claim 2, wherein the block of obtaining a rotation frequency value of the target wheel according to the N wheel acceleration values obtained by sampling comprises:
   performing averaging process for the N wheel acceleration values obtained by sampling, and obtaining N processed wheel acceleration values;
   performing a frequency domain processing for the N processed wheel acceleration values, to obtain a corresponding spectrogram; and
   acquiring a frequency value corresponding to a spectrum point with a maximum dB value in the spectrogram, to serve as the rotation frequency value of the target wheel.

4. The method as claimed in claim 3, the block of performing a frequency domain processing for the N processed wheel acceleration values, to obtain a corresponding spectrogram, comprises:
   performing one of a discrete fourier transform operation and a fast fourier transform operation for the N processed wheel acceleration values, to obtain the corresponding spectrogram.

5. The method as claimed in claim 3, wherein the preset number is P, P is smaller than or equal to N;
   wherein the block of acquiring a frequency value corresponding to a spectrum point with a maximum dB value in the spectrogram, to serve as the rotation frequency value of the target wheel comprises:
   when P is an integer number, acquiring a frequency value corresponding to the P-th spectrum point in the spectrogram, to serve as the rotation frequency value of the target wheel; and
   when P is a non-integer number, acquiring a first frequency value corresponding to a first spectrum point with an integer serial number in the spectrogram less than the non-integer number P and nearest to the non-integer number P, and a second frequency value corresponding to a second spectrum point with an integer serial number in the spectrogram larger than the non-integer number P and nearest to the non-integer number P, and obtaining the rotation frequency value of the target wheel by performing a weighting processing for the first frequency value and the second frequency value.

6. The method as claimed in claim 2, wherein the block of acquiring a first rotation angular position of the target wheel at the first moment based on the rotation frequency value of the target wheel and the N wheel acceleration values obtained by sampling comprises:
   acquiring a second association relationship between wheel acceleration values obtained by sampling and sampling moments, based on the rotation frequency value of the target wheel, wherein the second association relationship is: $y=A*\sin(2\pi f*t+\varphi 1)$, wherein t is any sampling moment starting from the first moment, y is a corresponding wheel acceleration value obtained by sampling at the sampling moment t, A is a variation amplitude of the wheel acceleration, f is the rotation frequency value of the target wheel, and $\varphi 1$ is a phase of the wheel acceleration at the first moment; and
   acquiring the first rotation angular position based on the N wheel acceleration values obtained by sampling, corresponding sampling moments of the N wheel acceleration values, and the second association relationship.

7. The method as claimed in claim 6, wherein the block of acquiring the first rotation angular position based on the N wheel acceleration values obtained by sampling, corresponding sampling moments of the N wheel acceleration values, and the second association relationship comprises:
   substituting each of the N wheel acceleration values obtained by sampling and a corresponding sampling moment of each of the N wheel acceleration values into the second association relationship respectively, and using a least square algorithm, to obtain an optimal solution of the phase $\varphi 1$ of the wheel acceleration at the first moment, which is served as the first rotation angular position.

8. The method as claimed in claim 2, wherein the block of acquiring a second rotation angular position of the target wheel at the second moment based on the rotation frequency value of the target wheel, the first rotation angular position, and a time length between the first moment and the second moment comprises:
   determining a third association relationship between the first rotation angular position and the second rotation angular position;
   obtaining the second rotation angular position according to the rotation frequency value of the target wheel, the first rotation angular position, the time length between the first moment and the second moment, and the third association relationship.

9. The method as claimed in claim 8, wherein the third association relationship is: $\varphi 2=2\pi f*t'+\varphi 1$, wherein f is the rotation frequency value of the target wheel, t' is the time length between the first moment and the second moment, $\varphi 1$ is the first rotation angular position, and $\varphi 2$ is the second rotation angular position.

10. The method as claimed in claim 8, wherein the time length between the second moment and the first moment is equal to a time length between the third moment and the second moment.

11. A tire pressure monitoring system, comprising at least one tire pressure monitoring device, a plurality of wheel speed sensors, a vehicle processor, and a display coupled to one another;
   wherein each of the at least one tire pressure monitoring device is installed on a corresponding target wheel of a vehicle and configured to acquire pressure data of the corresponding target wheel, a first rotation angular position of the corresponding target wheel at a first moment, and a second rotation angular position of the corresponding target wheel at a second moment, and to send the pressure data of the corresponding target wheel, the first rotation angular position of the corresponding target wheel at the first moment and the second rotation angular position of the corresponding target wheel at the second moment to the vehicle processor;
   wherein the plurality of wheel speed sensors are installed on all wheels of the vehicle in a one to one correspondence and each of the plurality of wheel speed sensors is configured to acquire a reference angular position difference of a corresponding wheel between the first moment and the second moment, and to send the reference angular position difference of the corresponding wheel between the first moment and the second moment to the vehicle processor;
   wherein the vehicle processor is configured to position the corresponding target wheel based on a magnitude relationship between a target angular position difference and the reference angular position difference of each wheel, and to control the display to display a positioning result and the pressure data of the corresponding target wheel, wherein the target angular position difference is a difference between the second rotation angular position and the first rotation angular position,
   wherein each of the at least one tire pressure monitoring device is configured to:
      sampling wheel acceleration of the target wheel for N times from the first moment to a third moment to obtain N wheel acceleration values of the target wheel by using the method for sampling wheel acceleration as claimed in claim 1, wherein each of the N wheel acceleration values comprises at least one of a centrifugal acceleration component and a tangential acceleration component;
      obtaining a rotation frequency value of the target wheel according to the N wheel acceleration values obtained by sampling;
      acquiring the first rotation angular position of the target wheel at the first moment based on the rotation frequency value of the target wheel and the N wheel acceleration values; and
      acquiring the second rotation angular position of the target wheel at the second moment based on the rotation frequency value of the target wheel, the first rotation angular position, and a time length between the first moment and the second moment;

wherein the second moment is earlier than or the same as the third moment.

12. The tire pressure monitoring system as claimed in claim 11, wherein each tire pressure monitoring device comprises a tire pressure monitoring chip and a battery, the tire pressure monitoring chip comprises a pressure sensor, an acceleration sensor, a controller, and a radio frequency emitter, the controller is an microcontroller unit and powered by the battery, the pressure sensor and the acceleration sensor couple to the microcontroller via a multiplexer and a differential amplifier circuit, the radio frequency emitter employs a 434 MHz antenna for data transmission and transmits the data to the vehicle processor.

13. The tire pressure monitoring system as claimed in claim 11, wherein the display comprises a plurality of alarm lights having a one-to-one correspondence with a plurality of tires, the vehicle processor is configured to control an alarm light corresponding to a tire to light up, when a tire pressure of the tire is not in a preset range.

* * * * *